D. KEETHLER.
Corn Planter.
No. 105,090. Patented July 5, 1870.
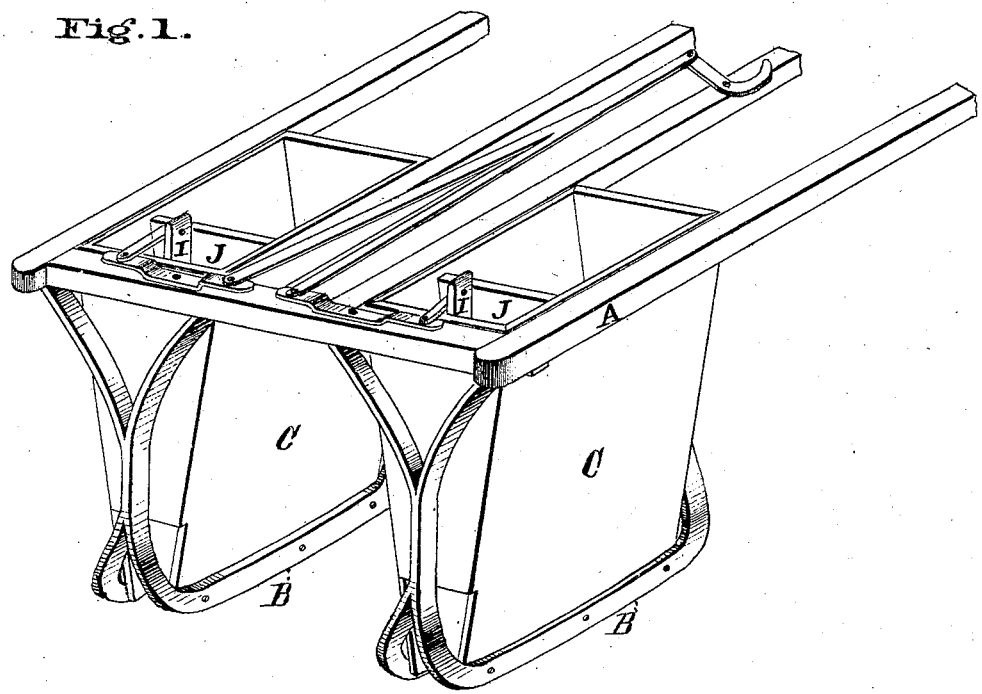
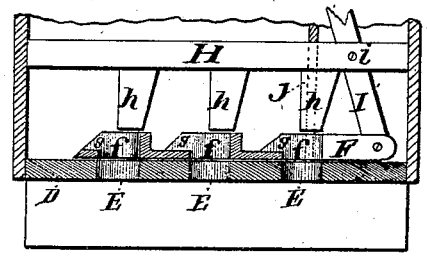
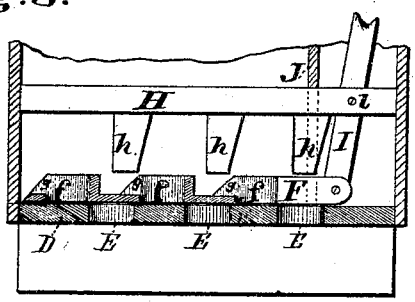
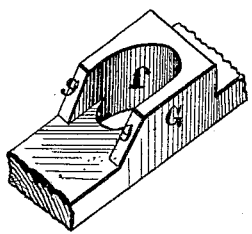

United States Patent Office.

DANIEL KEETHLER, OF MOUNT OREB, OHIO.

Letters Patent No. 105,090, dated July 5, 1870.

IMPROVEMENT IN CORN-PLANTERS.

The Schedule referred to in these Letters Patent and making part of the same.

I, DANIEL KEETHLER, of Mount Oreb, Brown county, Ohio, have invented a new and useful Improvement in Corn-Planters, of which the following is a specification.

Nature and Objects of the Invention.

The first part of my invention relates to a seed-delivering mechanism adapted to scattering the individual grains, two, three, or more to a hill, as may be desired, without injuring or cutting the grains.

The second part of my invention consists in a mode of supporting and protecting the hopper.

General Description with Reference to the Drawing.

Figure 1 is a perspective view, showing a part of the main frame and two suspended hoppers embodying my invention.

Figure 2 is a longitudinal section of the lower part of my hopper, the distributer being open downward.

Figure 3 is a similar section, the distributer being open upward.

Figure 4 is an enlarged perspective view of a portion of my improved slide.

Depending from the frame A are wrought-iron hangers B, one for each hopper C, which hangers serve to effectually support their respective hoppers, and to protect them from being struck by external objects.

The bottom D of each hopper has a series of openings, E, each one just big enough to hold a grain of the required seed, so as to deliver the grain in a scattered condition instead of all in a single pile or heap.

The seed-slide F has apertures $f$, which correspond, and, in one position of the slide, coincide with the openings E in the hopper-bottom.

The sides of these apertures are guarded by inclined shoulders or curbs G, whose sloping forward surfaces $g$ prevent the injury of the seed by cutting or bruising the same when the slide is in motion.

Secured within the hopper is a bar, H, having pendants $h$, which serve to intercept or "cut off" surplus seed and prevent its entrance into the slide.

The slide F is operated by a lever, I, pivoted to the bar E at $i$.

J is a partition to keep the grain from interfering with the operation of the lever.

Claims.

1. In the described combination, with the series of pendants $h$ and the openings E in the hopper bottom, the correspondingly-perforated slide F, having the inclined shoulders G, for the purposes explained.

2. The described arrangement of frame A, wrought-iron hangers or guards B, and hoppers C.

In testimony of which invention I hereunto set my hand.

DANIEL KEETHLER.

Witnesses:
   GEO. H. KNIGHT,
   JAMES H. LAYMAN.